United States Patent [19]

Edelman

[11] 4,269,759
[45] May 26, 1981

[54] 3,3'-TETRAGLYCIDYLSULFONYLDIANILINE THERMOSETTING COMPOSITIONS AND POLYBUTADIENE RUBBER MODIFIED THERMOSETTING COMPOSITIONS PREPARED FROM THE SAME

[75] Inventor: Robert Edelman, Richmond, N.Y.

[73] Assignee: Celanese Corporation, New York, N.Y.

[21] Appl. No.: 62,873

[22] Filed: Aug. 1, 1979

[51] Int. Cl.³ .......................... C08L 63/00; C08K 7/06
[52] U.S. Cl. ............................... 260/42.17; 260/42.28; 428/367; 525/122; 525/911; 525/914; 528/391
[58] Field of Search ................ 528/391; 525/122, 914; 260/42.17, 42.28

[56] References Cited

U.S. PATENT DOCUMENTS

| | | | |
|---|---|---|---|
| 3,014,895 | 12/1961 | Reynolds | 528/391 |
| 3,678,131 | 7/1972 | Klapprott | 525/122 |
| 3,686,359 | 8/1972 | Soldatos | 525/122 |
| 3,707,583 | 12/1972 | McKown | 260/42.28 |
| 3,823,107 | 7/1974 | Cotton | 525/122 |
| 3,894,113 | 7/1975 | Pagel | 525/122 |
| 3,926,903 | 12/1975 | Scola | 525/122 |
| 3,926,904 | 12/1975 | Scola | 525/122 |
| 3,931,354 | 1/1976 | Sheppard | 260/836 |
| 4,016,022 | 4/1977 | Browning | 525/122 |
| 4,025,578 | 5/1977 | Siebert | 260/42.28 |
| 4,107,128 | 8/1978 | Hosoi | 260/42.17 |

FOREIGN PATENT DOCUMENTS 907844 10/1962 United Kingdom .

*Primary Examiner*—Paul Lieberman
*Attorney, Agent, or Firm*—Kenneth A. Genoni

[57] ABSTRACT

The present invention is directed to (1) an epoxy compound identified as 3,3'-tetraglycidylsulfonyldianiline (referred to herein as 3,3'-TGDDS); (2) a thermosetting composition comprising 3,3'-TGDDS and a curing agent; (3) a thermosetting composition having improved resistance to moisture and to a reduction in the glass transition temperature at elevated temperatures when cured comprising (a) the above epoxy compound, i.e., 3,3'-TGDDS, (b) a polybutadiene rubber or mixture thereof, (c) an epoxy curing agent such as 4,4'-diaminodiphenylsulfone, (d) a free radical initiator and esterification catalyst for the polybutadiene rubber; and (4) a carbon fiber/rubber modified epoxy composite prepared from the thermosetting composition of (3).

The 3,3'-TGDDS when melted and admixed with the polybutadiene rubber in a solventless system forms a homogeneous mixture which is stable for extended periods.

8 Claims, No Drawings

3,3'-TETRAGLYCIDYLSULFONYLDIANILINE THERMOSETTING COMPOSITIONS AND POLYBUTADIENE RUBBER MODIFIED THERMOSETTING COMPOSITIONS PREPARED FROM THE SAME

BACKGROUND OF THE INVENTION

High performance carbon fiber/epoxy composites are currently being considered for use in the aerospace industry for light weight structural parts to improve both payload capability and fuel efficiency. These epoxies have excellent fabricating characteristics and are the most commonly used matrix resins in applications not exceeding use temperatures of 280°–350° F. Such composites should preferably be capable of withstanding operating temperatures up to about 350° F. for extended periods of time.

One disadvantage of many of the epoxy materials of the prior art employed to make these composites is their tendency to absorb moisture even at ambient conditions. Moisture pickup is accelerated in hot humid environments where composite part temperatures may approach such severe environmental conditions as 140° F. and 75 to 100 percent relative humidity even when the composite part is not in actual use. The result is a significant lowering of the glass transition temperature of the composite part. Mechanical properties at the desired elevated use temperatures are severely reduced when this occurs since at temperatures increasingly above the Tg the thermoset composition becomes increasingly more plastic. Consequently, when such composites are exposed for brief periods to temperatures of about 300° to about 350° F. while being subjected to stress they often are adversely affected. Dimensional changes may also occur in parts which have absorbed water upon exposure to humid environments. These dimensional changes can cause severe difficulty in areas where close tolerances must be maintained.

An epoxy formulation currently used to prepare carbon fiber/epoxy prepregs as illustrated by U.S. Pat. No. 4,107,128 is 4,4'-tetraglycidylmethylenedianiline commonly known as MY-720 which has the structural formula:

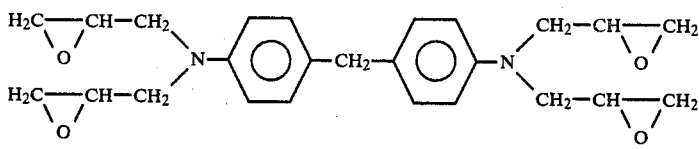

This material is a high functionality, low viscosity, high reactivity epoxy with excellent wetting ability and provides a thermoset polymer exhibiting good initial high temperature (e.g., 350° F.) stability but only moderate moisture resistance when cured with a commonly used curing agent such as 4,4'-diaminodiphenyl sulfone. Consequently, under environmental conditions of high humidity and high temperatures (e.g., 140° F.) over extended periods of about 25 to 35 days the Tg of MY-720 cured with 4,4'-diaminodiphenylsulfone is reduced substantially. The ability of such thermoset polymers to withstand temperatures of from about 300° to about 350° F. is, therefore, substantially reduced.

Epoxies are believed to attract significant amounts of moisture because of the extensive presence of oxygen, and in some cases nitrogen in their structures. Hydrogen bonding in the matrix produces sites that bind water very tightly. In addition, the bound water is present in the matrix at points where "soft" easily plasticized elements such as the following are present:

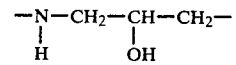

In recent years, systems other than the epoxies have been examined and found to exhibit varying moisture resistance while maintaining reasonable property levels after exposure to hot-humid environments. Polysulfone thermoplastics pick up less water than the epoxies and their Tg is not significantly affected by this process. Polyimides pick up levels of water similar to epoxies but property levels are not significantly affected. Both materials have their drawbacks as prepregging resins. Polysulfone is a thermoplastic high viscosity material not readily handled by conventional prepregging equipment. Polyimides release volatiles during cure which can result in voids in the final part. Recently, addition polyimides have been made available (Keremid, Rhodia Inc., N.J.) which cure by an addition mechanism and not by condensation. These materials, however, are quite expensive and are known to contain microcracks when cured.

Modified epoxy systems, such as Hystl ™ rubber modified epoxies (HME) have also known examined as a possibility for overcoming the moisture pick up problem. Hystl ™ rubber typically comprises 18.8 percent, by weight, of carboxyl terminated 1,4-polybutadiene with the remainder being carboxyl terminated 1,2-polybutadiene. The higher the content of the rubber in the cured system, however, the greater the decrease in the elevated temperature properties thereof even in the absence of moisture. Hystl ™ rubber when combined with various epoxies gives cured systems which show a significantly lower tendency to pick up water under hot-wet conditions than do epoxies alone.

Extensive work in this area was performed for the Air Force Materials Laboratory by the TRW Systems Group. The original HME resins were prepared by initially reacting Hystl ™ C-1000 rubber with an epoxy novolak in methyl ethyl ketone to provide a block copolymer system.

Several phenolic novolak epoxies as well as cresol novolak epoxies were examined as possible epoxy candidates. The requirements which guided the selection of these epoxy resins included high epoxy functionality to yield an intense cross-linked network, solubility in a common solvent with the polybutadiene resin, and high temperature stability.

The choice of the 1,2-polybutadiene system instead of 1,4-polybutadiene was based on the desire to achieve a rigid network which would have greater strength, when subjected to temperatures of 300°–350° F., than the more flexible 1,4-system.

The presence of the carboxyl end groups on the rubber was thought to aid compatibility between the hydrophobic rubber and the hydrophilic epoxy. The Hystl TM rubber chosen (C-1000, M.W.=1,350) had a low molecular weight which allowed for minimal distance between epoxy groups so as to maintain adequate high temperature properties. The viscosity of the Hystl TM rubber at 45° C. of 5000–20,000 cps was also in the useful range for handling with many epoxy systems. This material is commercially available from Dynachem Inc. (Irvine, Calif.).

No mention is made of the glycidylamine (MY-720) resin in their work.

The amine curing agent chosen was benzyldimethylamine (BDMA). Such tertiary amine cured systems, however, generally have limited temperature and chemical resistance. A peroxide was included for rubber cure. The epoxy finally chosen as the primary candidate was Ciba Geigy's ECN-1280 a multi functional epoxy cresol novolak which has a functionality of 5.1. This material is a solid with a melting point of 78°–81° C. and an epoxide equivalent weight of 230. This material is excessively brittle and consequently had to be modified by selecting a Hystl TM rubber having a high amount of 1,4-vinyl polybutadiene rubber and a low amount of the 1,2-isomer thereof. The final HME product resulting from this TRW effort had a maximum service temperature of about 275° F. Even at 275° F. the interlaminar shear strength was quite low.

Further work has been done in the area of HME systems since the initial TRW work. Hercules followed up this initial work and prepared materials capable of being hot-melt coated in a solventless system. Hercules, however, used a cycloaliphatic epoxy i.e., 2,3-epoxycyclohexylmethyl-2',4'-epoxycyclohexyl-carboxylate which they found to be compatible with Hystl TM rubber on mixing of the two materials. TRW had used a solvent system to combine the epoxy with the acid terminated rubber. Hercules also used more Hystl TM rubber in their formulation than did TRW (80 vs. 45%).

A solvent system presents an environmental pollution problem as well as a flammability problem. In addition the solvent must be removed during the curing procedure since it does not participate in the curing reaction. This is a further disadvantage since extensive vacuum is employed. Furthermore, any solvent not removed before final cure will result in gas pockets which create voids in the laminate. The presence of voids in the laminate contribute to reduced properties since they act as stress concentration points from which cracks in the laminate can form.

A more recent approach to making carbon fiber/epoxy composites conducted by TRW involved the use of a mixture of epoxies to achieve a compatible blend in combination with Hystyl TM rubber. The mixture of epoxies included DEN 438 epoxy novolak and ERE 1359 resorcinol epoxy resin and is cured with 4,4-diaminodiphenylsulfone. In addition a significant level of bis-(4-maleimidophenyl) methane was added to the mixture to obtain increased high temperature performance. The results of tests performed on the laminates prepared from the above composition at 350° F. evidence a low interlaminar-shear strength even before exposure to moisture. It was concluded that the low shear strength at elevated temperatures was a result of the presence of the rubber. Attempts were made to improve the strength of the interface of the fiber to the rubber in the matrix to no avail.

A more detailed discussion of the work described above may be found in R. W. Vaughn and G. A. Zakrzewski, "Development of HME Laminating Resin," AFML-TR-75-194, October 1975; R. A. Johnson et al., "Low Flow, Low Pressure Prepregs," Air Force Materials Laboratory, interim reports for November 1976 and January 1977, IR-324-(1) and (2); C. E. Browning, "Selective Application of Materials for Products and Energy: HME Resin Matrix Systems" 23 Science of Advanced Materials and Process Engineering Series, pp. 541–51 (1978); and L. G. Adams and R. E. Hoffman, "Coupling Agents-HMS Resin System", AFML-TR-77-196 (1977).

Thus, although the HME systems described above reduced water pickup quite dramatically (50% reduction over typical epoxy systems), their shear strength at elevated temperatures is inferior to that achieved with currently used epoxy systems which are not modified with rubber in order to achieve moisture resistance such as the MY-720 epoxy resin cured with 4,4-diaminodiphenylsulfone. It is suggested that the poor performance with respect to shear strength at elevated temperatures of the HME Systems described above may be attributed to the use of epoxy compounds such as phenol or cresol epoxy novolaks which do not achieve a sufficiently high cross-linked density in the thermoset system.

In contrast, if one attempts to modify the MY-720 epoxy resin, which is capable of achieving a high cross-linked density with Hystl TM rubber and 4,4-diaminodiphenyl sulfone curing agent, a two phase system results due to the incompatibility of the components of the system.

Thus, the problems associated with providing a rubber modified epoxy system are two fold. If a solventless rubber modified epoxy system is desired for making prepregs, which is usually the case for reasons described herein, an epoxy system (epoxy resin and curing agent) must be used which is capable of forming a compatible mixture with the rubber. If a high level of elevated temperature properties is desired, the epoxy system must, in addition, be suitable for elevated temperature usage (e.g., possess a high initial dry $T_g$ which is not substantially reduced by either the presence of the rubber or the absorption of moisture). Epoxy systems which meet both of these requirements are quite limited.

Other examples of rubber and epoxy containing compositions may be found in U.S. Pat. Nos. 3,686,359; 3,947,522 and 4,020,030. None of these patents disclose the use of TGDDS in combination with a rubber.

Thus, there has been a continuing search for an epoxide compound and a thermosetting composition employing said epoxide which when cured can form castings or carbon fiber/epoxy composites meeting the above described two fold requirement.

The present invention is a result of this search.

It is therefore a general object of the present invention to alleviate the problems of the prior art.

It is a further object of the present invention to provide a novel epoxy compound and thermosetting composition prepared from the same.

It is another object of the present invention to provide a novel epoxy compound and curing agent which is compatible with a polybutadiene rubber.

It is a further object of the present invention to provide a polybutadiene rubber modified epoxy thermosetting composition which when cured exhibits enhanced moisture resistance and high elevated temperature properties as determined by an improved resistance against a reduction in the glass transition temperature of the cured composition when subjected to temperatures of about 140° to about 180° F. in a humid environment.

It is a still further object of the present invention to provide a polybutadiene rubber modified thermosetting epoxy composition which when cured exhibits enhanced moisture resistance and high elevated temperature properties as evidenced by an improved resistance against a reduction in the glass transition temperature of the cured composition when subjected to temperatures of about 140° to about 180° F. in a humid environment.

It is another object of the present invention to provide a carbon fiber/polybutadiene rubber modified epoxy composite having improved moisture resistance, and high elevated temperature properties as evidenced by an improved resistance against a reduction in the glass transition temperature of the composite when subjected to temperatures of about 140° to about 180° F. in a humid environment.

These and other objects and features of the invention will become apparent from the claims and following description.

SUMMARY OF THE INVENTION

In one aspect of the present invention there is provided a compound comprising 3,3'-tetraglycidylsulfonyldianiline.

In another aspect of the present invention there is provided a thermosetting composition which when cured has improved resistance to moisture and improved resistance against reductions in the glass transition temperature when subjected to temperatures of about 140° to about 180° F. at a relative humidity of from about 50 to about 100 percent comprising (a) 3,3'-tetraglydidylsulfonyldianiline; (b) an effective amount of a curing agent selected from at least one member of the group consisting of 4,4'-diaminodiphenylsulfone and 3,3'-diaminodiphenylsulfone; (c) a carboxyl terminated polybutadiene rubber comprising from about 80 to about 100%, by weight, 1,2-polybutadiene and from about 20 to about 0%, by weight, 1,4-polybutadiene, wherein said polybutadiene rubber is present in said composition in an amount of from about 30 to about 40%, by weight based on the weight of (a) and rubber; (d) an effective amount of a chromium octoate esterification catalyst; and (e) an effective amount of at least one free radical initiator having a decomposition half life at 350° F. of not greater than about 2 minutes.

In a further aspect of the present invention there is provided a carbon fiber reinforced composite which when cured has improved resistance to moisture and improved resistance to reductions in the glass transition temperature when subjected to temperatures of about 140° to about 180° F. at a relative humidity of about 50 to about 100% comprising (1) a carbonaceous fibrous ribbon containing at least about 90% by carbon by weight in intimate association with (2) a thermosetting composition in the A through C stages of cure comprising (a) 3,3'-tetraglydidylsulfonyldianiline; and (b) an effective amount of a curing agent selected from at least one member of the group consisting of 4,4'-diaminodiphenylsulfone and 3,3'-diaminodiphenylsulfone; (c) a carboxyl terminated polybutadiene rubber comprising from about 80 to about 100%, by weight, 1,2-polybutadiene and from about 20 to about 0%, by weight, 1,4-polybutadiene, wherein said polybutadiene rubber is present in said composition in an amount of from about 30 to about 40%, by weight based on the weight of (a) and rubber; (d) an effective amount of chromium octoate esterification catalyst and (e) an effective amount of at least one free radical initiator having a decomposition half life at 350° F. of not greater than about 2 minutes.

DESCRIPTION OF THE PREFERRED EMBODIMENTS

The present invention is directed to (1) an epoxy compound identified as 3,3'-tetraglycidylsulfonyldianiline (referred to herein as 3,3'-TGDDS); (2) a thermosetting composition comprising 3,3'-TGDDS and a curing agent; (3) a thermosetting composition and process for preparing the same comprising (a) the above epoxy compound, i.e., 3,3'-TGDDS, (b) a polybutadiene rubber or mixtures thereof, (c) an epoxy curing agent, (d) a free radical initiator and esterification catalyst for the polybutadiene rubber; and (3) a carbon fiber/rubber modified epoxy composite.

3,3'-tetraglycidylsulfonyldianiline has the following structural formula:

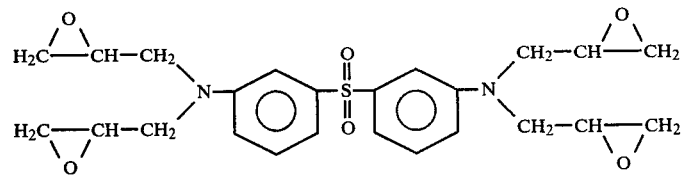

The weight epoxide equivalent (W.P.E.), i.e., the number of grams of the epoxide compound that contains one mole equivalent of epoxy, of 3,3'-TGDDS can theoretically be as low as 118, but more practically generally varies from about 130 to about 145 (e.g., 136). The 3,3'-TGDDS compound of the present invention, when cured with the curing agents as described herein, has a high temperature stability in an environment of about 300° to about 350° F., a high epoxy functionality, and a high reactivity.

The 3,3'-TGDDS epoxy compound can be used in the preparation of thermosetting compositions which can be employed to make castings. Such thermosetting compositions will comprise the 3,3'-TGDDS compound, a suitable curing agent, and optionally a catalyst when a faster cure is desired.

Suitable epoxy curing agents are well known and include polyhydric phenols, such as a 2,2'-bis(4-hydroxyphenyl) propane also known as bisphenol A, aromatic and aliphatic primary and secondary amines, amides such as dicyandiamide, polyamides, such as the fatty polyamides derived from dimerized linoleic acid and ethylenediamine or diethylenetriamine, polymercaptans and the like, all of which must have a functionality of at least 2.

The preferred curing agents are primary and secondary polyamines.

Representative polyamines which may be utilized include ethylene diamine, tetramethylene diamine, bis(- hexamethylene)triamine, triethylenetetramine, methanediamine, β-aminoethylpiperazine, 1,3-diaminocyclohexane, N-methyl-1,3-diaminocyclohexane, 4,4'-methylenebis(cyclohexylamine), m-phenylenediamine, o- and m-toluenediamines, 4,4'-diaminodiphenylmethane, cumene diamine, 4,4',4''-triaminotriphenylmethane, 4,4'-diaminodiphenylsulfone, 2,4,4'-triaminodiphenyl ether, 2,4-bis(4-aminobenzyl)aniline and 3,3'-diaminodiphenylsulfone.

The most preferred curing agent is 4,4-diaminodiphenylsulfone (herein referred to as 4,4'-DDS).

Suitable catalysts which may be employed to speed up the epoxy homopolymerization reaction include metal halide Lewis acids and their complexes such as zinc chloride, stannic chloride, boron trifluoride-piperidine complex and boron trifluoride-monoethanolamine complex.

The amount of the curing agent employed in the thermosetting composition in the absence of rubber will be any amount effective to cure or crosslink the 3,3'-TGDDS and be substantially completely reacted at the completion of the cure.

Thus, although any effective amount of curing agent can be employed, it is preferred that such amount be from about 0.50 to about 0.90, preferably from about 0.55 to about 0.80, and most preferably from about 0.60 to about 0.75, equivalents per epoxy equivalent of 3,3'-TGDDS. In the case of the polyamines one amino hydrogen is equivalent to one epoxy group.

The optional catalyst is employed in amounts of from about 0.50 to about 5%, preferably from about 0.75 to about 3%, and most preferably from about 1 to about 2%, by weight, based on the weight of the 3,3'-TGDDS epoxy compound.

The curing agent and optional catalyst may be mixed with the 3,3'-TGDDS epoxy compound, such as in a melt or in solution in a suitable solvent. Preferably the 3,3'-TGDDS is heated to a temperature of from about 90° to about 95° C. to aid in mixing the curing agent and optional catalyst.

The composition can be poured into a suitable mold and cured at temperatures from room temperature (25° C.) up to about 200° C. depending on the reactivity of the curing agent or catalyst.

Suitable curing procedures which may be employed for the thermosetting compositions can be conducted in accordance with the curing procedures employed in connection with the rubber modified epoxy composition described hereinafter.

The particular properties of 3,3'-TGDDS render it particularly suitable for preparing moisture resistant polybutadiene rubber modified thermosetting epoxy formulations, and more specifically, polybutadiene rubber modified epoxy formulations which can be employed to prepare thermally stable, moisture resistant carbon fiber composites.

Thus, it has been found that 3,3'-TGDDS mixes very readily with a polybutadiene rubber to provide a stable compatible and homogeneous mixture in a solventless system.

3,3'-TGDDS differs from the MY-720 epoxy compound described above in that the methylene bridge of MY-720 is substituted by a sulfone group. It is not readily apparent why the 3,3'-TGDDS material is more compatible with the rubber than the MY-720 material. Although not wishing to be bound by any particular theory, it is believed that the polar sulfone groups interact with the double bonds of the rubber.

The particular choice of epoxy curing agent for the rubber modified epoxy composition is limited by the requirement that the epoxy curing agent be compatible with both the rubber and the epoxy compound when mixed.

The choice of the epoxy curing agent is further limited when the cured rubber modified epoxy composition in which it is incorporated must exhibit high elevated temperature properties. The suitability of a curing agent for the epoxy of the rubber modified epoxy composition, in addition to compatibility, is generally determined by measuring its heat deflection temperature. Thus, suitable curing agents should possess a heat deflection temperature (ASTM D 648) of not less than about 185° C. and preferably from about 190° to about 200° C.

Suitable epoxy curing agents which meet both of the above requirements include 4,4'-diaminodiphenylsulfone, and 3,3'-diaminodiphenylsulfone.

Catalysts are typically not employed with the epoxy-rubber mixture since they tend to reduce elevated temperature properties and increase moisture pickup.

The preferred curing agent is 4,4'-diaminodiphenylsulfone.

The amount of the epoxy curing agent in the polybutadiene rubber modified composition is preferably selected so that it will completely react with the 3,3'-TGDDS by employing less than a stoichiometric equivalence of curing agent with respect to the epoxide. This avoids the presence of excess unreacted curing agent in the cured composition which adversely influences the properties thereof.

In determining the equivalents of curing agent employed, the number of epoxy groups which react with the polybutadiene rubber are accounted for. Hence, the amount of curing agent is based on effective epoxy equivalents of the 3,3'-TGDDS.

Although any effective amount of curing agent may be employed it is preferred that such effective amount constitute from about 0.55 to about 0.80, and most preferably from about 0.60 to about 0.75 (e.g., 0.60) equivalents per effective epoxy equivalent of 3,3'-TGDDS. The effective epoxy equivalents of the 3,3'-TGDDS can easily be determined. For example, since the total number of theoretically available epoxy equivalents in the 3,3'-TGDDS is reduced by reaction with the rubber, the reaction of the epoxy group with the carboxyl end groups of the rubber increases the effective W.P.E. of the unreacted 3,3'-TGDDS (which is the basis of calculating the curing agent equivalent/epoxy equivalent ratio). The extent of the increase in the effective W.P.E. of the 3,3'-TGDDS is determined by dividing the number of epoxy groups per gram of the unreacted 3,3'-TGDDS (as determined by the W.P.E. thereof) by the number of epoxy groups per gram theoretically remaining after reaction of the 3,3'-TGDDS with the rubber, and multiplying the result by the original W.P.E. of the unreacted 3,3'-TGDDS. Once the effective W.P.E. of 3,3'-TGDDS is determined by accounting for the reaction with rubber, it is a simple matter to determine the equivalents of curing agent per effective equivalent of 3,3'-TGDDS based on a stoichiometry of less than 1 as described above.

The polybutadiene rubber employed in the rubber modified epoxy composition of the present invention comprises 1,2-polybutadiene. Minor amounts of 1,4-polybutadiene may also be present within the rubber to add flexibility, although this isomer does not cure as well as the 1,2-isomer due to the lack of pendant vinyl groups. Moreover, increasingly higher amounts of the 1,4-isomer has a greater deleterious effect on the glass transition temperature of the final cured composition than similar amounts of the 1,2-isomer.

Accordingly, the polybutadiene rubber comprises from about 80 to about 100%, preferably from about 90 to about 100%, by weight thereof, of 1,2-polybutadiene and from about 20 to about 0%, preferably from about 10 to about 0%, by weight thereof, of 1,4-polybutadiene.

It is preferred that the polybutadiene rubber be end capped with carboxyl groups since the presence of such groups may further aid compatibility of the epoxide and rubber.

The carboxyl groups present on the polybutadiene rubber react with 3,3'-TGDDS by the following idealized reaction:

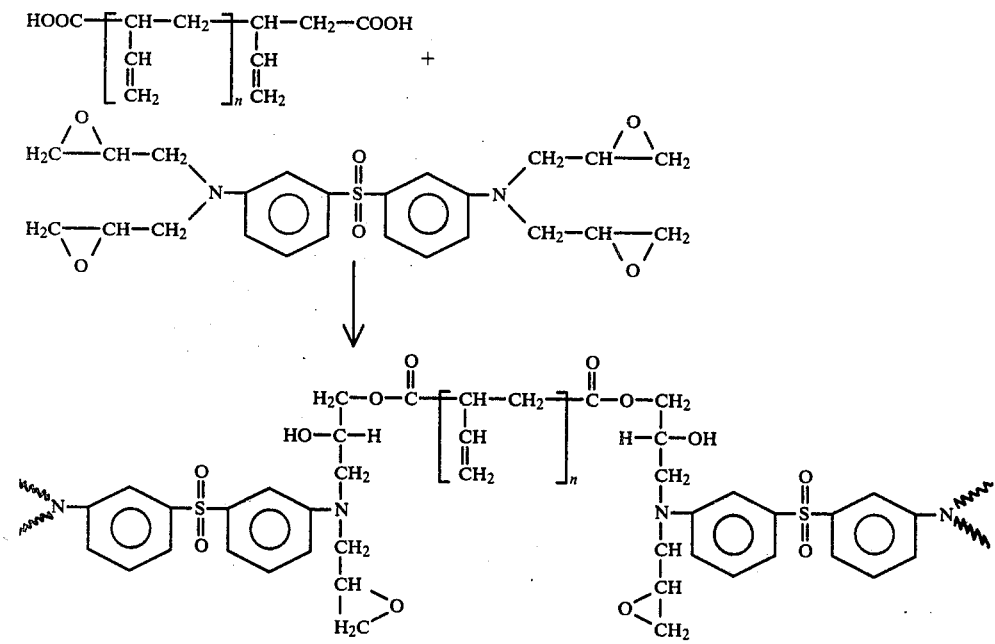

wherein n is at least 20, and preferably from about 20 to about 25.

The number average molecular weight of the polybutadiene rubber prior to curing can vary from about 1200 to about 1500, and preferably from about 1300 to about 1350.

The viscosity of the polybutadiene rubber at 45° C. can vary from about 50 to about 200 poise.

The carboxyl end group (CEG) content of the polybutadiene rubber is preferably greater than about 1.0 meq/gm typically from about 1.0 to about 1.2 meq/gm, and preferably about 1.1 to about 1.15 meq/gm.

By "carboxyl end group content" is meant the number of carboxylic acid end groups present in the rubber polymer, measured in microequivalents/gram (meq/gm). The number of carboxylic acid end groups may be measured by dissolving the rubber in a solvent mixture of 70% o-cresol and 30% chloroform and potentiometrically titrating this solution with 0.1 N trimethylammonium hydroxide.

The polybutadiene rubber is blended with the 3,3'-TGDDS in an amount of not less than about 30%, by weight, based on the weight of the 3,3'-TGDDS and rubber. If the amount of rubber in the blend is less than about 30% the viscosity of the mixture increases to the extent that degassing and pouring becomes quite difficult even at temperatures of about 95° to 100° C.

Typically, the amount of polybutadiene rubber can vary from about 30 to about 40%, preferably from about 31 to about 38%, and most preferably from about 32 to about 35% by weight, based on the weight of the 3,3'-TGDDS and rubber. Increasingly higher amounts of rubber in excess of about 40% induces an increasingly greater reduction in the elevated temperature properties of the cured composition.

Two types of catalysts are employed in conjunction with the polybutadiene rubber, namely, free radical initiators and esterification catalysts.

Free radical initiators are catalysts employed to promote vinyl polymerization during the initial cure of the polybutadiene rubber and are well known in the art. The free radical initiator for use in the thermosetting composition which is to be employed to make carbon fiber/epoxy composites preferably has a decomposition half-life at 350° F. of not greater than about 2 minutes, typically from about 0.5 to about 2 minutes, and most preferably from about 1 to about 1.5 minutes. This permits the rubber and the epoxy to cure at the same temperature.

The half-life of the free radical initiator at any specified temperature is defined as the time in which the initiator loses half of its active functional group content. In the case of the peroxide initiators, for example, the half-life is the time in which the peroxide loses half of its active oxygen content.

Suitable classes of free radical initiators include peroxide and azo compounds typically known to promote vinyl polymerization and mixtures thereof.

The preferred free radical initiators are the peroxide catalysts.

Representative examples of the peroxide catalysts having a suitable half-life of about 1 to 2 minutes include dicumyl peroxide, 2,5-dimethyl-2,5-di-t-butylperoxyhexane and mixtures thereof.

The preferred peroxide catalyst is 2,5-dimethyl-2,5-di-t-butylperoxyhexane available from the Lucidol Division of Pennwalt under the trade name Lupersol ™ 101.

Although any amount of free radical initiator may be employed which is effective to promote the curing of the polybutadiene rubber it is preferred that such effective amount constitute from about 4 to about 8%, preferably from about 4.5 to about 7%, and most preferably from about 5 to about 6%, by weight, based on the weight of the rubber.

The second type of catalyst which is employed in conjunction with the polybutadiene rubber induces a reaction between the polybutadiene rubber acid end groups and the epoxy groups of the 3,3'-TGDDS. An acceptable esterification catalyst which furthers this reaction and does not promote epoxy homopolymerization is chromium octoate which is available from Cordova Chemical under the trade name AMC-2 ™.

Although any effective amount of the esterification catalyst may be employed, it is preferred that such effective amount constitute from about 0.005 to about 1.0%, preferably from about 0.008 to about 0.5%, and most preferably from about 0.01 to about 0.1%, by weight, based on the weight of the polybutadiene rubber.

Preparation of 3,3'-Tetraglycidylsulfonyldianiline

The procedure described in U.S. Pat. No. 2,951,822, the disclosure of which is herein incorporated by reference, can be modified to prepare 3,3'-TGDDS.

Thus, 3,3'-diaminodiphenylsulfone is reacted in an alcohol solvent, such as ethanol, with a 100 to 400% stoichiometric molar excess of epichlorohydrin.

The 3,3'-diaminodiphenylsulfone employed to prepare the 3,3'-TGDDS is preferably subjected to a recrystallization procedure wherein it is dissolved in a solvent such as ethyl alcohol by heating. The solution is then boiled, contacted with activated charcoal while boiling, and filtered while hot to remove colored impurities. The filtered solution is then cooled to room temperature to induce crystallization. The recrystallization procedure purifies the 3,3'-DDS.

The excess epichlorohydrin is used to minimize higher molecular weight species.

A reaction temperature of about 80° C. is preferred in order to minimize polymer formation resulting from attack of the glycidyl nitrogen on another epoxy group. This is similar to a cure mechanism. In contrast, bisphenol A epoxy materials can be prepared at the reflux temperature of epichlorohydrin (119° C.) since this problem is absent from these systems.

A mole of water is added per amino hydrogen to catalyze attack of the amine on the glycidyl group of the epichlorohydrin. This reaction will only proceed sluggishly under anhydrous conditions.

The reaction is monitored by analyzing the reaction solution for the epichlorohydrin content. This can be readily done by reacting an aliquot of the reaction solution with a solution of pyridinium hydrochloride in pyridine. The unreacted hydrochloride is then titrated with standardized base to determine the epichlorohydrin content. The initial reaction step takes about 20 hours. The extended reaction time is a consequence of the low basicity of the nitrogens present in the reaction system. When the theoretical uptake of epichlorohydrin is reached the reaction temperature is lowered to about 60° C. for reaction with base. The remainder of the synthesis is done without any significant changes from the basic procedure described in the above-identified patent.

A 25% excess of sodium hydroxide is used to insure substantially complete dehydrochlorination of the initial reaction product. After base addition, epichlorohydrin is stripped off at a final temperature of no higher than 65° C. This is designed to minimize the probability of highly exothermic and potentially explosive curing reactions occurring between the residual base and the highly concentrated glycidyl amine.

The product is then recovered by dissolving it in methyl isobutyl ketone.

The organic layer is washed extensively with water. Emulsification problems may occur after the fourth water wash. This problem can be minimized to some extent by slow mixing of the final water wash with the organic layer.

Final removal of solvent is carried out under vacuum at an ultimate maximum oil bath temperature of about 140° C. for about 30 minutes. This procedure provides a dry solvent-free system.

Preparation of Polybutadiene Rubber Modified 3,3'-TGDDS Using 4,4'-diaminodiphenylsulfone Curing Agent While the polybutadiene rubber modified 3,3'-TGDDS thermosetting composition can be prepared using a suitable solvent, such as acetone or methyl ethyl ketone, to achieve mixing of the components of the mixture and impregnation of a carbon fiber ribbon it is an advantage of the present invention that the 3,3'-TGDDS compound can be employed in a solventless system.

While the order of mixing of the rubber, and 4,4'-diaminodiphenylsulfone curing agent with the 3,3'-TGDDS in a solventless system is not critical to achieve a homogeneous mixture, it is preferred to add the 4,4'-DDS first to the 3,3'-TGDDS, and then the rubber.

Since 3,3'-TGDDS has little or no flexibility at room temperature, it is preferably heated to a temperature of at least about 90° C. to give it a plastic flow which simplifies mixing the additional components of the composition.

The 4,4'-diaminodiphenylsulfone is preferably preheated to a temperature of from about 110° to about 150° C. (e.g., 140° C.) to shorten its melting time. A shorter melting time reduces the chances of oxidation which tends to discolor the curing agent.

The 4,4'-diaminodiphenylsulfone is then rapidly melted and mixed with the fluid epoxide.

The polybutadiene rubber is typically a liquid at room temperature and can be added to the 3,3'-TGDDS/4,4'-DDS mixture without heating. It is preferred, however, to preheat the rubber to temperatures of about 80° to about 120° C. (e.g., 100° C.) for about 15 to about 30 (e.g., 25) minutes to facilitate mixing.

The chromium octoate esterification catalyst is preferably added to the rubber before mixing it with the epoxide to assure complete solubilization. The free radical initiator is preferably added to the 3,3'-TGDDS-rubber mixture but may also be added to the rubber before it is mixed with the epoxide.

The polybutadiene rubber modified epoxy composition of the present invention is relatively stable at room temperature. Moreover, the composition is stable at elevated temperatures for a time sufficient to prepare a casting or a B-stage prepregged system. The presence of the rubber in the composition also alters the flow properties thereof in a manner sufficient to reduce the need for bleeder plies and dams in the composite prepreg layup.

The polybutadiene rubber modified epoxy composition is cured in several stages at progressively higher temperatures for decreasingly shorter periods of time to avoid the buildup of the exothermic heat of reaction which can lead to cracks in the final composition, particularly casting compositions. The exothermic heat of reaction is less of a problem with carbon fiber/epoxy composites since the fiber prepreg is thermally conductive and dissipates heat rapidly.

Accordingly, although any effective progressive curing combination of temperature and time may be employed, it is preferred that the rubber modified epoxy composition when in the configuration of a casting, be cured at a temperature of about 90° to about 100° C., preferably from about 95° to about 98° C., for a period of about 18 to about 24 hours, preferably from about 19 to about 22 hours (first step), again at temperatures of about 115° to about 130° C., preferably from about 120° to about 125° C. for a period of about 2 to about 4 hours, preferably from about 2.5 to about 3.5 hours (second step), again at a temperature of about 140° to about 160° C., preferably from about 145° to about 155° C., for a period of about 1.5 to about 3 hours, preferably from about 2 to about 2.5 hours (third step), and finally again at temperatures of about 170° to about 180° C., preferably from about 173° to about 177° C., for a period of about 1.5 to about 3 hours, preferably from about 1.75 to about 2.5 hours (fourth step). Thus, a four-step progressive curing procedure is preferred for castings.

When the rubber modified epoxy composition is in the configuration of a carbon fiber/epoxy composite it is preferred to employ a vacuum bag autoclave to achieve cure. Accordingly, in a preferred curing cycle vacuum is applied to the bag at room temperature for 15 minutes, the composite is heated gradually at a rate of about 4° F./minute to about 275° F., and maintained thereat for about one hour. An external pressure of about 20 psi is then applied by the autoclave and upon reaching this pressure the vacuum is vented and an additional 55 psi is applied. The composite is heated at the rate of 4° F./min. to 350° F. and maintained thereat for about 2 hours. The composite is then cooled at the above described pressure.

The observable effects of the progressive curing procedure on the rubber modified epoxy composition can be characterized as falling within three stages, namely, stages A through C. A resin in the A-stage is characterized as a flowable liquid and is substantially uncured. A resin in the B-stage is characterized as being partially cured and has neither the consistency of a flowable liquid nor the consistency of a rigid solid. A resin in the B-stage of cure is therefore soft and tacky in its consistency and may be readily molded. Upon the passage of time, even at room temperature, a resin in the B-stage will eventually assume a C-stage consistency. A resin in the C-stage of cure has set to a rigid solid consistency and may not subsequently be rendered plastic or flowable upon the reapplication of heat. It is therefore essential that the rubber modified epoxy composition of the present invention be molded to the desired configuration prior to the point when the curing reaction has progressed to the C-stage.

The rubber modified epoxy system is observed to be in the B-stage of cure after the first step of the progressive curing procedure and enters the C-stage when subjected to temperatures described in the fourth step. Post cure heating can be employed after curing has progressed to the C-stage to assure that the thermosetting reaction is complete by heating the composition at a temperature of about 175° to about 200° C. for a period of about 6 to about 16 hours.

When the 3,3'-TGDDS is employed alone, curing temperatures and times will be similar to those described for the rubber modified epoxy subject to the considerations discussed above relating to the exothermic heat of reaction.

As will be evident from the discussion below, the progressive curing steps do not have to occur in rapid succession. Thus, if a rubber modified epoxy impregnated carbon fiber ribbon is prepared, it can be formed into the desired configuration immediately and cured to the C-stage. Alternatively, C-stage curing can be postponed if the impregnated carbon fiber composite is to be shaped at a later time.

As described above, the rubber modified epoxy composition of the present invention can be employed to prepare carbon fiber reinforced composites commonly formed by impregnating carbon fibers when uncured (i.e., A-stage) or partially cured (i.e., B-stage) in accordance with commonly assigned U.S. Pat. No. 3,844,822 the disclosure of which is herein incorporated by reference.

The terms "carbon" fibers or "carbonaceous" fibers are used herein in the generic sense and include graphite fibers as well as amorphous carbon fibers. Graphite fibers are defined herein to consist substantially of carbon and have a predominant X-ray diffraction pattern characteristic of graphite. Amorphous carbon fibers, on the other hand, are defined as fibers in which the bulk of the fiber weight can be attributed to carbon and which exhibit a predominantly amorphous X-ray diffraction pattern. Graphite fibers generally have a higher Young's modulus than do amorphous carbon fibers and in addition are more highly electrically and thermally conductive.

Numerous procedures have been employed for the conversion of various organic polymeric fibrous materials to a carbonaceous form while retaining the original fibrous configuration essentially intact. Such procedures have in common the thermal treatment of the fibrous precursor in an appropriate atmosphere or atmospheres which is commonly conducted in a plurality of heating zones, or alternatively in a single heating zone wherein the fibrous material is subjected to progressively increasing temperatures. See, for instance, U.S. Pat. No. 3,539,295 for a representative conversion process which is herein incorporated by reference.

The carbon fiber/rubber modified epoxy composites of the present invention comprise from about 30 to about 55%, preferably from about 35 to about 55%, and most preferably from about 35 to about 40% rubber modified epoxy composition by volume, based on the volume of the composite and correspondingly about 70 to about 45%, preferably about 65 to about 45%, and most preferably about 65 to about 60% carbon fiber, by volume, based on the volume of the composite.

Carbon fiber reinforced composites of the present invention can be, via a prepreg form or not formed into various kinds of articles by using any conventional molding technique such as a press molding technique, vacuum bag autoclave molding technique, sheet winding technique and the like. Preferably they are formed by coating or impregnating carbon fibers typically in the form of a ribbon with the uncured or partially cured rubber modified epoxy system described herein which ultimately serves as the matrix or continuous phase in the composite article, shaping the same into the desired configuration (e.g., prepregging), and fully curing the same to form a rigid monolithic structure.

Carbonaceous fibrous ribbons which can serve as the starting material of a graphite fiber epoxy composite contain at least about 90 percent carbon by weight. The carbon fibers of the ribbon may exhibit either an amorphous carbon or a predominantly graphitic carbon X-ray diffraction pattern. In a preferred embodiment, the carbon fibers contain at least about 95 percent carbon by weight and exhibit a predominantly graphitic X-ray diffraction pattern.

The width of the carbonaceous fibrous ribbon may conveniently vary from about 0.5 to 12 inches, or more.

The carbonaceous fibrous ribbon may comprise a single flat tow of continuous carbon filaments or a plurality of substantially parallel multifilament fiber bundles which are substantially coextensive with the length of the ribbon.

In the latter embodiment the carbonaceous fiber bundles of the ribbon may be provided in a variety of physical configurations. For instance, the bundles of the ribbon may assume the configuration of continuous lengths of multifilament yarns, tows, strands, cables, or similar fibrous assemblages. The multifilament bundles are preferably lengths of a continuous multifilament yarn. The fiber bundles within the ribbon optionally may be provided with a twist which tends to improve their handling characteristics. For instance, a twist of about 0.1 to 5 tpi, and preferably about 0.3 to 1 tpi, may be imparted to each fiber bundle. Also, a false twist may be used instead of or in addition to a real twist. Alternatively, the fiber bundles may possess substantially no twist.

Multifilament fiber bundles may be provided within the ribbon in a substantially parallel manner in the substantial absence of bundle crossovers to produce a flat ribbon. The number of parallel multifilament bundles present within the carbonaceous ribbon may be varied widely, e.g., from 6 to 1,000, or more. In one embodiment, a ribbon precursor is selected having a weft pick interlaced with substantially parallel fiber bundles in acccordance with the teachings of commonly assigned U.S. Pat. No. 3,818,082, which is herein incorporated by reference. It is not essential, however, that the parallel fiber bundles or the filaments of a flat tow be bound by any form of weft interlacement when constructing carbon filter tapes for resin impregnation in accordance with the procedures described herein.

The carbonaceous ribbon which serves as the starting material for the fiber/epoxy composite may be produced in accordance with a variety of techniques as will be apparent to those skilled in the art. For instance, organic polymeric fibrous materials which are capable of undergoing thermal stabilization may be initially stabilized by treatment in an appropriate atmosphere at a moderate temperature (e.g., 200° to 400° C.), and subsequently heated in an inert atmosphere at a more highly elevated temperature, e.g., 900° to 1,000° C., or more, until a carbonaceous fibrous material is formed. If the thermally stabilized material is heated to a maximum temperature of 2,000° to 3,100° C. (preferably 2,400° to 3,100° C.) in an inert atmosphere, substantial amounts of graphite carbon are commonly detected in the resulting carbon fiber, otherwise the carbon fiber will commonly exhibit a substantially amorphous X-ray diffraction pattern.

The exact temperature and atmosphere utilized during the initial stabilization of an organic polymeric fibrous material commonly vary with the composition of the precursor as will be apparent to those skilled in the art. During the carbonization reaction elements present in the fibrous material other than carbon (e.g., oxygen and hydrogen) are substantially expelled. Suitable organic polymeric fibrous materials from which the carbonaceous ribbon may be derived include an acrylic polymer, a cellulosic polymer, a polyamide, a polybenzimidazole, polyvinyl alcohol, etc. Acrylic polymeric materials are particularly suited for use as precursors in the formation of the carbonaceous ribbon. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole. Preferred carbonization and graphitization techniques for use in forming the carbonaceous ribbon are described in commonly assigned U.S. Pat. Nos. 3,667,705; 3,775,520; and 3,900,556. Each of the disclosures of these patents is herein incorporated by reference.

The carbonaceous ribbon optionally may be surface treated in order to improve its ability to bond to the rubber modified thermosetting epoxy composition described herein. Conventional surface modification techniques may be selected. Preferred surface modification treatments are disclosed in commonly assigned U.S. Pat. Nos. 3,723,150; 3,723,607; 3,762,941; 3,767,774; 3,821,013; and 3,859,187 the disclosures of which are herein incorporated by reference.

In preparing the carbon fiber/epoxy composite, the carbonaceous ribbon in a preferred embodiment is continuously conveyed to the impregnation zone while in a flat configuration. The ribbon may be conveyed in accordance with conventional fiber advancing techniques, and is preferably under a uniform tension across its width when it arrives at the impregnation zone.

While present in the impregnation zone the rubber modified epoxy composition described herein in the A-stage is forced onto intimate association with the fibers of the ribbon. The rubber modified epoxy will typically exhibit a viscosity at 100° C. of about 1000 to about 5000 cps, preferably from about 1000 to about 3000 cps during impregnation.

The rubber modified epoxy composition in the A-stage is moderately heated to a temperature of about 95° to about 100° C. during the impregnation step to achieve the desired viscosity.

The technique utilized to force the rubber modified epoxy thermosetting composition into intimate association with multifilament fiber bundles of the ribbon may be varied. It is essential, however, that the impregnation technique selected results in no substantial diminution of the tensile properties of the carbonaceous bundles. In a preferred embodiment the thermosetting composition is initially applied to the ribbon by briefly passing the ribbon through a vessel containing the same, and the ribbon bearing the thermosetting composition adhering to its surface is next passed between a pair of parallel nip rollers. In addition to immersion the thermosetting composition initially may be satisfactorily applied by spraying, extruding, etc., prior to passage between a pair of nip rollers. One of the nip rollers optionally may be provided with a flat groove corresponding in which to the width of the ribbon, and the other nip roller provided with a substantially matching raised surface which in combination with the grooved roller provides a rectangular gap for the ribbon. The force exerted by such nip rolls causes the resin system to flow throughout the ribbon. Alternatively, the impregnation step may be accomplished through the use of pultrusion or other application technique capable of bringing out the desired impregnation.

The carbonaceous ribbon while in intimate association with the rubber modified epoxy thermosetting composition is next interposed between the outer surfaces of a pair of flexible endless belts. The belts preferably have smooth nonporous surfaces, are relatively thin so as to permit efficient heat transfer therethrough in the heating zone as described hereafter, and are capable of being readily stripped from a ribbon impregnated with the tacky rubber modified epoxy composition in the B-stage. The belts are capable of withstanding the temperatures employed in the subsequent heating zone, are capable of withstanding wash solvents, and may be formed from a variety of materials. Preferred endless belts are formed from fiberglass reinforced polytetrafluoroethylene sheets having a thickness of about 0.005 to 0.030 inch. Flexible endless belts alternatively may be formed from flexible metallic strips or other fiber reinforced flexible resinous materials. The width of the endless belts is greater than the width of the ribbon interposed therebetween (e.g., 0.5 to 2 inches or wider), so that the ribbon has each of its surfaces completely covered by the endless belts. The ribbon is preferably interposed substantially at the center of each belt and is aligned in parallel with the edges of the belts.

While interposed between the flexible belts, the impregnated ribbon is continuously passed in the direction of its length through a substantially enclosed heating zone provided with a heated gaseous atmosphere wherein the belts and the ribbon are looped in a single wrap about each of a multiplicity of rotating spaced parallel rollers wherein the inner surfaces of the belts are in alternating contact with the rollers as the belts and the ribbon progress through the heating zone. The heating zone may be relatively compact and provided with a plurality of pairs of spaced parallel rollers. As the belts and the ribbon pass through the heating zone as a unitary body, the impregnated ribbon remains between the belts at a fixed location in the absence of sliding contact and is substantially suspended within the heating zone. As the belts and ribbon intermittently pass over the rotating rollers a flexing action occurs and pressure is exerted on alternating sides of the ribbon which further improves the uniformity of the thermosetting composition's distribution throughout the ribbon. Each side of the ribbon is uniformly heated at the same temperature while passing through the heating zone.

The nature of heated gaseous atmosphere within the heating zone may be varied. For instance, ordinary air may be employed. Alternatively, inert gases such as nitrogen may serve as the gaseous atmosphere. The gas is preferably preheated prior to introduction into the heating zone such as by passing over electrical resistance heaters. Additionally, the gas is preferably circulated within the heating zone by continuously introducing and withdrawing a portion of the same.

While present in the heating zone, the rubber modified epoxy composition in intimate association with the ribbon is converted to a tacky B-stage consistency. The temperature of the gaseous atmosphere of the heating zone, as well as the residence time during which the ribbon is within the heating zone are controlled to achieve the progressive curing stages described herein. The resulting ribbon is continuously withdrawn from the heating zone while interposed between the flexible belts prior to a point in time when the rubber modified epoxy composition is advanced to a hard non-tacky C-stage consistency. The thermosetting composition in intimate association with the ribbon remains in a tacky B-stage consistency at the time of its withdrawal from the heating zone.

The impregnated carbonaceous ribbon is next separated from the flexible endless belts and may be collected or directly utilized in the formation of carbon fiber reinforced composite structures. The endless belts following separation from the impregnated ribbon may be washed with an appropriate solvent (e.g., acetone or methylene chloride) to remove any adhering rubber modified epoxy conposition and returned for further use.

The impregnated ribbon following its separation from the endless flexible belts may be positioned upon releasable interlay, such as silicone coated release paper, and collected by winding upon a flanged bobbin or other support where it may be stored for future use. The resulting ribbons commonly exhibit an extended shelf life at ambient conditions. For instance, the impregnated ribbons may be stored as long as several days at room temperature while still retaining a B-stage consistency. If stored under refrigeration (e.g., at about 0° C.), such ribbons commonly exhibit a considerably longer shelf life (e.g., up to about 180 days or more).

The rubber modified epoxy thermosetting compositions of the present invention when cured exhibit improved moisture resistance as determined by the moisture pickup test. This test is conducted by submerging a cast specimen of the composition in water and measuring the percent increase in weight thereof as a function of time. Weight measurements are conducted approximately every 3 days until the moisture pickup reaches equilibrium (e.g., for a period of about 35 days). To simulate humidity and temperature conditions which are slightly more severe than would ever be encountered in the natural environment, the moisture pickup is determined by heating the submerged cast specimens to a temperature of 180° F. The specimens exposed to this hot-wet environment will evidence a drop in the glass transition temperature.

The extent of the drop in glass transition temperature of the cast specimens is indicative of the degree of plasticization that a fiber/resin composite will undergo when subjected to a hot-wet environment. It is the plasticization of the composite which is believed to cause a reduction in the elevated temperature properties of the composite, such as composite shear strength, and not the breaking of chemical bonds at the fiber/resin interface since drying of the wet composite can restore much of the original properties.

Thus, the greater the reduction of glass transition temperature of the cast specimen upon exposure to a simulated hot-wet natural environment, the greater will be the probability that normal use temperatures in excess of about 300° F. will result in a significant reduction in the properties of the fiber/resin composite.

It has been found that the carbon fiber/rubber modified epoxy composition of the present invention exhibits improved resistance to reductions in the glass transition temperature when subjected to temperatures of about 140° to about 180° F. (e.g., 175° F.) and a relative humidity of from about 50 to about 100%, and preferably from about 60 to about 80%, thereby improving the composites mechanical properties, particularly shear strength, at temperatures of from about 280° to about 300° F.

The "wet" glass transition temperature is determined by Thermomechanical Analysis (TMA) from cast specimens which have been subjected to the moisture pickup test at 180° F. The particular method employed makes it possible to determine the Tg of a wet specimen.

The "wet" Tg is determined by using a DuPont 940 Thermomechanical Analyzer in the expansion mode. The wet specimen is cooled to −59.5° C. for less than one minute, to entrap moisture. The specimen is then heated at 20° C./minute with the expansion probe engaged with surface of the test specimen having the largest surface area (i.e., the specimen is laid flat rather than on its side) and the first change in the rate of volume expansion of the specimen is identified as the wet Tg of the specimen. The "dry" Tg is determined by measuring the rate of volume expansion of a similarly cooled specimen which has not been heated or submerged in water and which is desiccated (over $P_2O_5$) prior to testing.

The carbon fiber/rubber modified epoxy composites of the present invention find particular utility in the production of high performance composite structures which are highly useful in the aerospace industry. For instance, spoilers, ailerons, and similar lightweight structural components may be formed by conventional molding, or shaping techniques.

Castings of the 3,3'-TGDDS thermosetting compositions which do not employ a rubber can be employed to make electrical parts, and find utility in printed circuit applications, encapsulation and coatings.

The invention is additionally illustrated in connection with the following Examples which are to be considered as illustrative of the present invention. It should be understood, however, that the invention is not limited to the specific details of the Examples. All parts and percentages in the claims as well as the remainder of the specification are by weight unless otherwise specified.

EXAMPLE 1

3,3'-tetraglycidylsulfonyldianiline is prepared by the following method.

780 gms of reagent grade epichlorohydrin (96–98% pure by titration) 195 gms of 95% ethanol and 25 gms distilled water are placed into a two liter triple neck round bottom flask fitted with an overhead mechanical stirrer capable of rapid agitation and stirring under vacuum, a condenser and thermometer. 124 gms (0.5 mole) of recrystallized (as described hereinafter) 3,3'-diaminodiphenylsulfone is slowly added to the stirred solution at room temperature.

The solution is slowly heated in an oil bath to 80° C. (internal temperature) over a period of 60 minutes. As soon as the sulfone is completely in solution a pipette is used to remove 0.5 ml of the reaction solution. The pipetted solution is placed in an Erlenmeyer flask and weighed. To this material is added 25 ml of a pyridinium hydrochloride/pyridine solution by pipette plus 50 ml of reagent grade pyridine. The flask is then fitted with a condenser and heated at reflux for thirty minutes on a hot plate while stirring. The material is then analyzed for epichlorohydrin content by titration with 0.1 N sodium hydroxide using a 0.1% solution of bromocresol purple indicator in ethanol.

The reaction solution is stirred at 80° C. for twenty hours. At this point another 0.5 ml aliquot of the reaction solution is removed and analyzed. At this time approximately 2.65 meq of epichlorohydrin/0.5 gm of solution remains, indicating about 90% of the theoretical amount of epichlorohydrin has been consumed. The reaction is then continued for an additional 3–5 hours.

The reaction solution is cooled to 60° C. and 200 gms of 50% sodium hydroxide solution (2.5 moles) is added over a 200–220 minute period with fairly rapid stirring. Addition is done at a rate that allows the temperature to remain at 60° C. After the base addition the solution is stirred for an additional 30–40 minutes at 60° C.

A distillation condenser is then attached in place of the refluxing condenser and epichlorohydrin is distilled off under vacuum at an oil temperature no higher than 65° C. The maximum vacuum achieved is less than 0.5 mm/Hg.

The product is taken up in 400 ml of methyl isobutyl ketone (MIBK). Distilled water (300 ml) is also added to the flask to wash the organic layer free of sodium chloride and base. All of the salt cake not taken up in the water is discarded. The two layers are then placed in a Waring blender and agitated for several minutes. This is repeated two additional times, with 300 ml of water being used each time. The water layers are removed each time from the Waring blender by carefully pipetting out the bottom layer. This is done to minimize handling losses. The organic layer is washed a fourth time with 300 ml of water with very gentle agitation in the Waring blender to prevent emulsification. If emulsification does occur the emulsion is extracted several times with 200–250 ml portions of MIBK in order to achieve separation between the organic and water layers.

The organic and water layers are then placed in a separatory funnel and the water layer removed after the two layers are allowed to sit in the separatory funnel overnight. This is necessary since separation of the organic layer and water layer is extremely slow. The addition of fresh MIBK (about 200 ml) to the organic layer (with no mixing) can help facilitate the separation.

The MIBK is then distilled off under vacuum. The oil bath is allowed to slowly rise in temperature to 140° C. Stirring is done very rapidly at this point for an additional thirty minutes. A vacuum of 0.1 to 0.3 mm/Hg is used during this period. Care is taken during the distillation of the MIBK to keep the receiving vessel extremely cold (i.e., −70° C.) to prevent the MIBK from slowly distilling into a trap adjacent to the pump. The entire distillation is always done behind a protective shield since the behavior of the glycidyl amines is not totally predictable at elevated temperatures.

The residue remaining in the flask is allowed to cool to room temperature under vacuum. The highly viscous red-orange epoxy material is then carefully removed using an infra-red lamp. Yield is approximately 210 gms or 89% of theoretical yield.

The epoxide equivalent weight using the pyridinium hydrochloride/pyridine titration method indicates a W.P.E. of from 130 to 140. Epoxy content ranges from 84–91% by weight based on the weight of the 3,3'-TGDDS.

NMR analysis indicates 3.3 to 3.4 epoxy groups per sulfone linkage. Approximately 0.3 to 0.5 groups are considered to be "opened" epoxy groups, i.e., either reacted with water or extended through reaction with amine. Finally, 0.3 to 0.4 epoxy groups are absent because of the presence of unreacted starting amine.

Hydrolyzable chlorine levels range from 0.2 to 0.4% by weight based on the weight of the product. Total chlorine levels (Parr bomb) are in the range of 0.6 to 0.9%. The viscosity of the 3,3'-TGDDS at 100° C. as determined by a Brookfield Viscometer is 8,240 cps.

The procedure for recrystallizing the 3,3'-diaminodiphenylsulfone which is used in the synthesis of 3,3'-TGDDS is conducted in the following manner.

240 gms of 3,3'-diaminodiphenylsulfone are dissolved in 1800 cc of ethyl alcohol and heated to refluxing temperature in a 4 liter Erlenmeyer flask.

1.8 gms of Darco TM G-60 activated charcoal available from Fisher Scientific Co. is slowly added to the boiling solution. The solution is refluxed gently for 15–30 minutes. A filter funnel is heated with steam or hot water for 15 minutes and a bed of Celite TM analytical filter aid is placed in the filter funnel over No. 2 filter paper by slurrying the filter aid in ethyl alcohol and then pouring the slurry into the funnel and applying suction. Ethyl alcohol is then repeatedly run through the Celite TM until a clear alcohol filtrate is obtained. The bed of Celite TM should be about 0.25" thick. The hot solution containing the 3,3'-DDS is then filtered slowly. The filter funnel is kept at a temperature of 50° to 60° C. and a vacuum of about 100 mm/Hg is used for the entire filtration operation.

The filtrate obtained is heated again to dissolve any 3,3'-DDS that precipitates out during the filtration. The solution is then allowed to cool slowly at room temperature. When significant crystals of medium size are observed the filtrate is gently swirled to facilitate crystallization. After standing at room temperature for several hours the solution containing the crystals is cooled in the refrigerator overnight at a temperature of 0° C. The crystals are then removed by filtration and dried at about 65°–70° C. for 24 hours using a vacuum of 100 mm/Hg. 3,3'-DDS (180 gms) is obtained in 75% yield. The melting point of the 3,3'-DDS is between 170° and 173° C. I.R. and NMR analyses show no impurities.

EXAMPLE 2

This Example illustrates the preparation of a polybutadiene rubber modified 3,3'-TGDDS casting.

17.5 gms of the 3,3'-TGDDS prepared in accordance with Example 1 and having a W.P.E. of 136 are placed in a small beaker suspended in an oil bath at 90° C.

An overhead stainless steel stirrer and blade is used to rapidly stir the 3,3'-TGDDS and the subsequently resulting mixture. 4.3 gms (0.6 equivalents per effective epoxy equivalent) of 4,4'-diaminodiphenylsulfone is preheated in a 10 ml beaker and allowed to sit in a circulating air oven at 140° C. for 25 minutes. The preheating step shortens the length of time it takes to melt the 4,4'-DDS thereby providing less chance for oxidation thereof. The 4,4'-DDS is then rapidly melted on a hot plate and subsequently mixed in with the epoxy. No solid particles are observed in the mixture. 10.9 gms of carboxyl terminated polybutadiene rubber comprising a mixture of 81%, by weight thereof, of 1,2-polybutadiene and 19%, by weight thereof, of the 1,4-polybutadiene, and having a number average molecular weight of 1350, is warmed at 100° C. for 25 minutes and then added to the mixture. The rubber which is added to the mixture contains 0.01 gm of chromium octoate catalyst (i.e., AMC TM -2 from Cordova Chemical). Finally, 0.58 gm of 2,5-dimethyl-2,5-di-t-butylperoxy hexane (i.e., Lupersol TM -101 available from Lucidol Division of Pennwalt) is added to the mixture at the ratio of 5 parts peroxide/100 parts of rubber. A creamy dark tan mixture is obtained.

The mixture of the rubber, 3,3'-TGDDS, and the 4,4'-diaminodiphenylsulfone forms a creamy homogenous mixture which does not readily separate.

The mixture is then poured between two glass plates that are heavily coated with Frekote TM 33 release agent (available from Frekote Inc., Boca Raton, Fla.).

Prior to casting the plates are placed in the oven at 100° C. for 15 minutes to dry. The plates are then placed together using silicone rubber strips as separators. The strips can be obtained in a variety of thicknesses depending on the thickness of the casting desired. In this instance a thickness of ⅛" or 124 mils is used (the rubber mat is supplied by Baxter Rubber, Fairfield, N.J.). Small "C" clamps or hose tighteners are used to hold the glass pieces and rubber strips together. Care must be taken to make sure that the glass sides treated with Frekote TM are those surfaces that will be touching the resin mixture. For easier handling and pouring it will be preferable if one of the glass pieces is shorter than the other. This will allow for an area where the resin mixture can be easily applied to the single plate from which it can then flow between the two glass plates. The entire glass casting mold should be set in the curing oven at the initial curing temperature prior to filling with resin. This will keep the mold warm and allow more rapid filling.

The casting is then placed in an oven at 98° C. The oven is evacuated to 3 mm/Hg to degas the mixture and avoid voids in the cast specimens. Degasing continues for 25 minutes and the pressure is then increased to 125 mm/Hg and held there for an additional 40 minutes. Degasing of the epoxide is conducted between the plates. The casting is then placed in a circulating air oven at 96° C. The following cure cycle is used.

Cure schedule

96° C. for 20 hours
121° C. for 3 hours
149° C. for 2 hours
177° C. for 2 hours

After the cure cycle is complete the oven is turned off and the casting is allowed to cool to room temperature while remaining in the oven. The casting is then removed. Casting specimens of 0.5" by 0.9" by 0.125" are cut using a wet diamond saw. Smaller specimens ¼" square by 0.125" in thickness are also cut. All of the specimens are then subjected to a 6 hour post cure at 177° C. After the post cure the samples are removed quickly from the hot oven and allowed to cool in a desiccator. After cooling the individual larger size specimens are submerged in distilled water held by jars which are then placed in a 180° F. oven. The small samples are all placed (submerged) in separate jars also half filled with distilled water which are also placed in a 180° F. oven. Moisture pickup is determined on the large specimens approximately every three days. After 21 days the large specimens appear to reach an equilibrium point in moisture pickup and the smaller samples are then analyzed for wet glass transition temperature (Tg) by the TMA analysis procedure described herein. The data indicating the moisture pickup as a function of time is summarized in Table I as runs 1 to 7. The pertinent TMA data is summarized at Table II. "Dry" samples which have been desiccated are also tested for dry glass transition temperature in the manner described herein to serve as a control and the results also summarized at Table II.

COMPARATIVE EXAMPLE 1

A casting is prepared by reacting a mixture of 30 gms of 4,4'-tetraglycidylmethylenedianiline (MY-720) having a W.P.E. of 123, and 9.2 gms of 4,4'-diaminodiphenylsulfone.

More specifically, the MY-720 epoxide compound is placed in a small beaker and set in an oil bath at 70° C. An overhead stirrer is used to provide good mixing for the resin. The 4,4'-diaminodiphenylsulfone is melted on a hot plate and then slowly poured into the stirred resin. Some of the amine will cool to the extent that it will solidify on the beaker surface during pouring. Some additional 4,4'-DDS is melted and poured to compensate for this loss. Only melted 4,4'-DDS is added to the resin mix in order to get solutioning of the amine in the resin. The 4,4'-DDS is not remelted once it has solidified since this only causes extensive amine oxidation. Some amine degradation via oxidation occurs during the initial melting on the hot plate. Some of the amine solidifies after addition to the warmed resin. This solid debris is filtered out in order to minimize areas in the casting in which there is an excessive concentration of amine. Filtration is done through a fiberglass mesh cloth in order to remove solids (1 mm² opening). After mixing for several minutes the beaker is transferred to a vacuum oven for degassing. The mixture is then degassed at 85° C. for one hour and 1.5 mm/Hg prior to pouring between the plates. The casting procedure is conducted in accordance with the procedures of Example 2. Curing, post curing, environmental conditioning and testing are also conducted in accordance with the procedures of Example 2. Moisture pickup with time is summarized at Table I.

"Wet" samples are tested for glass transition temperature by TMA analysis when the moisture pickup reaches equilibrium after 36 days. "Dry" samples which have been desiccated are also subjected to TMA analysis to determine the dry glass transition temperature (Tg). The results of moisture pickup are summarized at Table I, and for (Tg) at Table II.

As can be seen from the data of Table I, the degree of moisture pickup of the rubber modified epoxy casting of Example 2 is significantly less than the control sample of Comparative Example 1 which employs MY-720 resin. With reference to Table II, it can be seen that while the initial "dry" Tg of the MY-720 is higher than the rubber modified 3,3'-TGDDS, it drops substantially below that of the latter after extended submersion in a hot humid environment. This indicates that the higher level of water absorbed by the control has a more detrimental effect on the Tg. The high Tg of the initial dry rubber modified 3,3'-TGDDS samples also indicates that the rubber did not have a severe detrimental effect on the Tg thereof, e.g., the initial dry Tg of the MY-720 and the rubber modified 3,3'-TGDDS are only 29° F. apart. The higher final Tg of the rubber modified 3,3'-TGDDS indicates that this material can be used at higher end use temperatures, e.g., about 280° to about 300° F. without a significant reduction in properties than can the MY-720 resin.

TABLE I

| Run No. | Submersion time (days) | Moisture pick up % |
|---|---|---|
| | Example 2 | |
| 1 | 4 | 2.6 |
| 2 | 7 | 3.0 |
| 3 | 10 | 3.2 |
| 4 | 14 | 3.4 |
| 5 | 18 | 3.5 |
| 6 | 21 | 3.5 |
| 7 | 32 | 3.7 |
| | Comparative Example 1 | |
| 1 | 3 | 2.7 |
| 2 | 8 | 3.9 |
| 3 | 11 | 4.2 |
| 4 | 14 | 4.4 |
| 5 | 18 | 4.6 |
| 6 | 21 | 4.7 |
| 7 | 25 | 4.9 |
| 8 | 36 | 5.1 |

TABLE II

| Run No. | Submersion Time[1] (days) Rubber Modified 3,3'-TGDDS | Submersion Time[1] (days) MY-720 | Tg(°F.) Rubber Modified 3,3'-TGDDS | Tg(°F.) MY-720 (Control) |
|---|---|---|---|---|
| 1 | 0 (dry) | 0 (dry) | 453 | 482 |
| 2 | 21 | 25 | 291 | 262 |
| 3 | 32 | 36 | 280 | 257 |

[1]Submersion in water at 180° F.

COMPARATIVE EXAMPLE 2

Example 2 is repeated with the exception that 4,4'-tetraglycidylmethylenedianiline (MY-720) having a W.P.E. of 123 is employed instead of 3,3'-TGDDS. When the MY-720 epoxide, the polybutadiene rubber, the 4,4'-DDS curing agent, and rubber catalysts have been combined the mixture is cured as described in Example 1. Small non-homogeneous areas believed to contain primarily cross-linked rubber particles can be observed distributed in the cured product. Such phase separation will result in non-uniform behavior in the properties of the cured product which renders such a rubber modified thermosetting composition unsuitable for use in a carbon/fiber composite.

EXAMPLE 3

The polybutadiene rubber modified 3,3'-TGDDS composition prepared in accordance with Example 2 prior to curing can be used to impregnate a carbonaceous ribbon having a width of 2.75 inches. The carbonaceous ribbon consists of a yarn bundle of 400 filaments having a twist of about 0.5 tpi, a total denier of about 400, and a predominately graphitic X-ray diffraction pattern. The yarn bundle is derived from an acrylonitrile homopolymer and contains in excess of 99% carbon by weight. The yarn bundle is immersed in the 3,3'-TGDDS composition which has a viscosity of 2000 cps at 100° C., and is in the A-stage of cure. The resulting epoxy coated yarn bundle is compressed between two Teflon TM pads to force the 3,3'-TGDDS composition into intimate association with the multifilament bundle.

The resin impregnated bundle sample is then laid up to make a part or panel of desired thickness and cured using a vacuum bag autoclave procedure. Thus, a vacuum of 202 mm/Hg at 25° C. for 15 minutes is applied. The sample is then heated at a rate of 2.2° C./min until a temperature of 135° C. is reached. This temperature is maintained for 60 minutes. A pressure of 20 psi is then applied followed by venting to the atmosphere. Pressure is then increased to 75 psi and the sample is again heated at a rate of 2.2° C./min until a temperature of 177° C. is achieved. This temperature is maintained at the described pressure for 2 hours. The sample is then cooled to 60° C. under pressure. To achieve maximum elevated temperature properties a post cure is employed by placing the unrestrained sample in a circulating hot air oven and the temperature thereof is raised from 25° C. at a rate of 2.2° C./min to 204° C. and maintained thereat for 4 hours.

The cured composite will exhibit improved resistance to moisture and reductions in the glass transition temperature.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A thermosetting composition which when cured has improved resistance to moisture and improved resistance against reductions in the glass transition temperature when subjected to temperatures of about 140° to about 180° F. at a relative humidity of from about 50 to about 100% comprising (a) 3,3'-tetraglydidylsulfonyldianiline; (b) an effective amount of a curing agent selected from at least one member of the group consisting of 4,4'-diaminodiphenylsulfone and 3,3'-diaminodiphenylsulfone; (c) a carboxyl terminated polybutadiene rubber comprising from about 80 to about 100%, by weight, 1,2-polybutadiene and from about 20 to about 0%, by weight, 1,4-polybutadiene, wherein said polybutadiene rubber is present in said composition in an amount of from about 30 to about 40%, by weight based on the weight of (a) and rubber; (d) an effective amount of a chromium octoate esterification catalyst; and (e) an effective amount of at least one free radical initiator having a decomposition half life at 350° F. of not greater than about 2 minutes.

2. The composition of claim 1 wherein the curing agent of (c) is 4,4'-diaminodiphenylsulfone which is present therein in an amount of from about 0.55 to about 0.80 equivalents per effective epoxy equivalent of (a), the esterification catalyst is present in said composition in an amount of from about 0.005 to about 1.0%, by weight, based on the weight of the rubber, and the free radical initiator is present in an amount of about 4 to about 8%, by weight, based on the weight of the rubber.

3. The composition of claim 2 wherein the polybutadiene rubber has a carboxyl end group content of about 1.0 to about 1.2 meq/gm, and a number average molecular weight of from about 1200 to about 1500.

4. The composition of claim 2 wherein the polybutadiene rubber comprises from about 90 to about 100%, by weight, 1,2-polybutadiene, and from about 10 to about 0%, by weight, 1,4-polybutadiene, which is present in the thermosetting composition in an amount of from about 31 to about 38%, by weight, based on the weight of (a) and rubber, and the free radical initiator is selected from at least one member of the group consisting of 2,5-dimethyl-2-5-di-t-butylperoxyhexane, and dicumyl peroxide.

5. The composition of claim 2 wherein the polybutadiene rubber is present in said composition in an amount of from about 32 to about 35%, by weight, the curing agent is present in said composition in an amount of from about 0.60 to about 0.75 equivalents per effective epoxy equivalent of (a), and the free radical initiator is 2,5-dimethyl-2-5-di-t-butylperoxyhexane.

6. A carbon fiber reinforced composite which when cured has improved resistance to moisture and improved resistance to reductions in the glass transition temperature when subjected to temperatures of about 140° to about 180° F. at a relative humidity of about 50 to about 100% comprising (1) a carbonaceous fibrous ribbon containing at least about 90% carbon by weight in intimate association with (2) a thermosetting composition in the A through C stages of cure comprising (a) 3,3'-tetraglydidylsulfonyldianiline; (b) an effective amount of a curing agent selected from at least one member of the group consisting of 4,4'-diaminodiphenylsulfone and 3,3'-diaminodiphenylsulfone; (c) a carboxyl terminated polybutadiene rubber comprising from about 80 to about 100%, by weight, 1,2-polybutadiene and from about 20 to about 0%, by weight, 1,4-polybutadiene, wherein said polybutadiene rubber is present in said composition in an amount of from about 30 to about 40%, by weight based on the weight of (a) and rubber; (d) an effective amount of chromium octoate esterification catalyst; and (e) an effective amount of at least one free radical initiator having a decomposition half life at 350° F. of not greater than about 2 minutes.

7. The composite of claim 6 wherein the polybutadiene rubber has a carboxyl end group content of about 1.0 to about 1.2 meq/gm and a number average molecular weight of from about 1200 to about 1500, the curing agent is 4,4'-diaminodiphenylsulfone which is present in said composition in an amount of from about 0.55 to about 0.80 equivalents per effective epoxy equivalent of (a), the esterification catalyst is present in said composition in an amount of about 0.005 to about 1.0%, by weight, based on the weight of (a) and rubber, and the free radical initiator is selected from at least one member of the group consisting of dicumylperoxide and 2,5-dimethyl-2-5-di-t-butylperoxyhexane which is present in an amount of about 4 to about 8%, by weight, based on the weight of the rubber.

8. The composite of claim 7 wherein the polybutadiene rubber comprises from about 90 to about 100%, by weight, 1,2-polybutadiene, and from about 10 to about 0%, by weight, 1,4-polybutadiene and is present in said thermosetting composition in an amount of from about 31 to about 38%, by weight, based on the weight of (a) and rubber, the curing agent is present in said composition in an amount of from about 0.60 to about 0.75 equivalents per effective epoxy equivalent of (a), and the free radical initiator is 2,5-dimethyl-2-5-di-t-butylperoxyhexane.

* * * * *